(12) United States Patent
Vesel et al.

(10) Patent No.: US 6,999,022 B1
(45) Date of Patent: Feb. 14, 2006

(54) SURVEILLANCE SYSTEM

(75) Inventors: Andrew M. Vesel, Indialantic, FL (US); C. Steven Paramore, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 56 days.

(21) Appl. No.: 10/653,508

(22) Filed: Sep. 2, 2003

(51) Int. Cl.
*G01S 13/76* (2006.01)
*G01S 13/93* (2006.01)

(52) U.S. Cl. ........................................ 342/30; 342/29
(58) Field of Classification Search ............... 342/30, 342/32, 29, 36, 37–42, 43
See application file for complete search history.

(56) References Cited

U.S. PATENT DOCUMENTS

| | | | | |
|---|---|---|---|---|
| 3,220,006 | A | 11/1965 | Young et al. ............... | 343/708 |
| 5,191,349 | A * | 3/1993 | Dinsmore et al. .......... | 343/751 |
| 6,002,347 | A | 12/1999 | Daly et al. .................. | 340/963 |
| 6,052,753 | A | 4/2000 | Doerenberg et al. ......... | 714/43 |
| 6,127,944 | A | 10/2000 | Daly et al. .................. | 340/963 |
| 6,154,169 | A | 11/2000 | Kuntman ..................... | 342/74 |
| 6,222,480 | B1 * | 4/2001 | Kuntman et al. ........... | 342/30 |
| 6,236,351 | B1 | 5/2001 | Conner et al. ............... | 342/26 |
| 6,313,753 | B1 | 11/2001 | Butler ..................... | 340/686.2 |
| 6,313,783 | B1 * | 11/2001 | Kuntman et al. ........... | 342/32 |
| 6,467,003 | B1 | 10/2002 | Doerenberg et al. ........ | 710/117 |
| 6,483,453 | B2 * | 11/2002 | Oey et al. .................... | 342/29 |
| 6,545,631 | B2 * | 4/2003 | Hudson et al. .............. | 342/30 |
| 6,788,245 | B1 * | 9/2004 | Johnson ....................... | 342/32 |
| 2002/0075171 | A1 | 6/2002 | Kuntman et al. .......... | 340/961 |

OTHER PUBLICATIONS

*Field Manual No. FM 24-18: Tactical Single-Channel Radio Communications Techniques*, Headquarters, Department of the Army, Washington, D.C., Sep. 30, 1987, retrieved from http://155.217.58.58/cgi-bin/atdl.dll/fm/24-18/fm24-18.htm.

* cited by examiner

*Primary Examiner*—Wilson Lee
*Assistant Examiner*—Minh Dieu A
(74) *Attorney, Agent, or Firm*—Nathan O. Jensen; Kyle Eppele

(57) ABSTRACT

A surveillance system for an aircraft includes a first antenna comprising a four radiating element antenna. The first antenna is configured for electrical coupling to a first air traffic control transponder and a first traffic alert and collision avoidance system, and a second antenna comprises a single element antenna configured for electrical coupling to a second air traffic control transponder. The surveillance system also comprises a second antenna comprising a single radiating element antenna configured for electrical coupling to a second air traffic control transponder. The surveillance system also comprises a first mounting interface configured for coupling the first antenna to the aircraft. The surveillance system also comprises a second mounting interface configured for coupling a second antenna to the aircraft. The mounting interface of the first antenna has a size and a shape corresponding to a size and shape of the mounting interface of the second antenna.

27 Claims, 7 Drawing Sheets

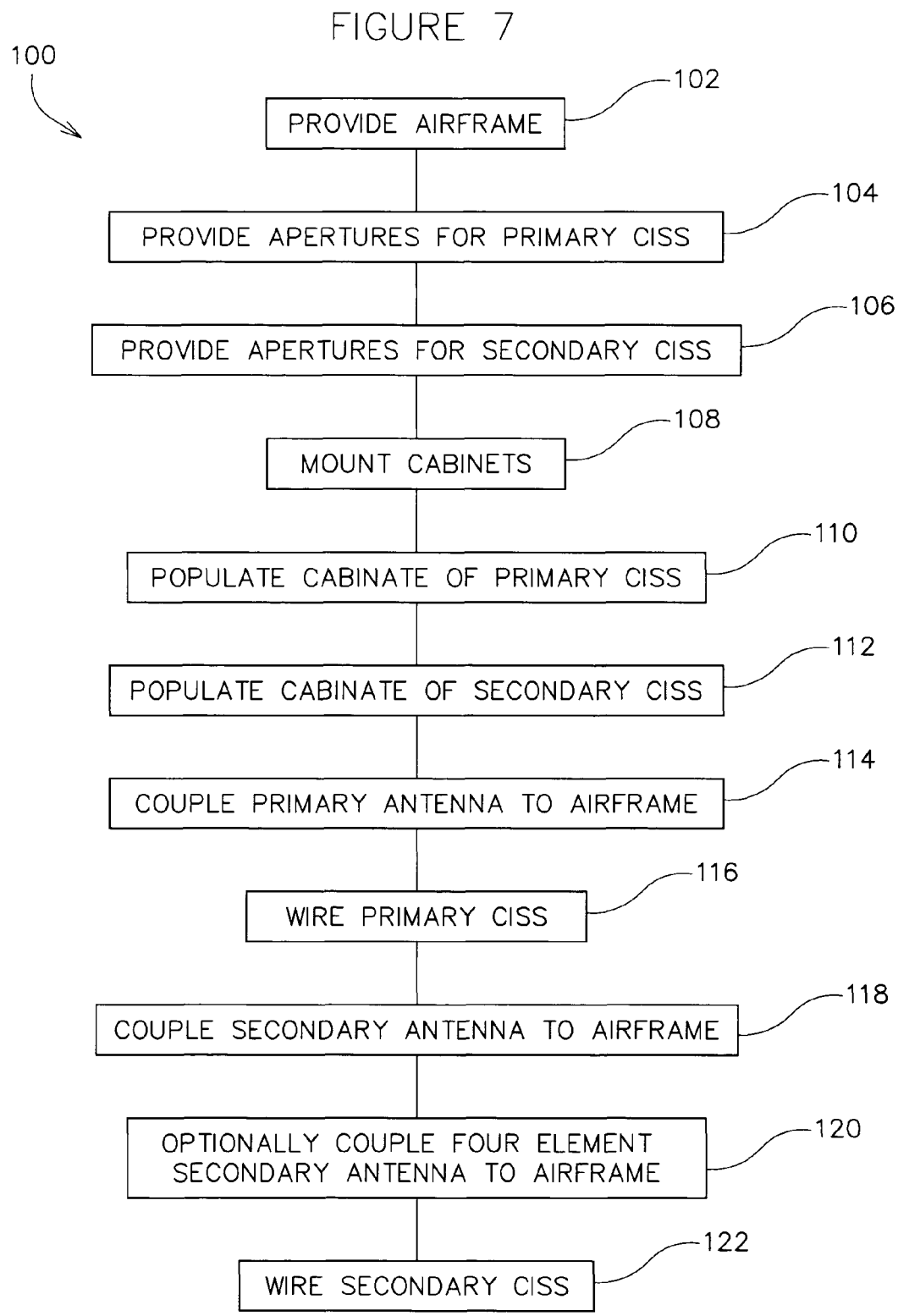

SURVEILLANCE SYSTEM

FIELD

The present invention relates to a surveillance system. More particularly, the present invention relates to a surveillance system for an aircraft.

BACKGROUND OF THE INVENTION

It is generally known to provide a surveillance system for an aircraft. Such surveillance system is intended to provide surveillance of the operational environment of the aircraft and to display this information to the flight crew.

Such surveillance system typically includes a single cabinet populated with the following components: an air traffic control transponder system ("ATC XPDR"), a traffic alert and collision avoidance system ("TCAS"), a terrain awareness and warning system ("TAWS"), and a weather detection and avoidance radar system ("WXR"). The cabinet is typically provided in the interior of the aircraft. Wires for the components of the surveillance system (i.e. the ATC XPDR and the TCAS) are typically routed from the cabinet to two four element antennas—one on the top and one on the bottom of the exterior of the aircraft. Such routing typically requires an aperture be provided in the fuselage of the aircraft.

Long range aircraft such as the A330 aircraft commercially available from Airbus S.A.S. of France and the B747 aircraft commercially available from the Boeing Company of Chicago, Ill. require the components of such surveillance system be present in dual, redundant form. The dual surveillance system configuration is intended to ensure that all functions necessary to dispatch the aircraft are present even after a failure of one of the components (and without the ready availability of spare or replacement components).

Other aircraft, particularly with shorter ranges, do not necessarily require all components of such surveillance system be present in dual, redundant form. For example, such other aircraft may require only a redundant or back-up ATC XPDR or no redundant components at all.

The original equipment manufacturer (OEM) provides the fuselage of such long and short range aircraft with the apertures intended for routing wires for such surveillance system. However, this has several disadvantages including that the apertures for the dual surveillance system configuration must be modified or retrofit (e.g. patched) to accommodate configurations having only one component of the surveillance system (e.g. the ATC XPDR) present in dual, redundant form.

Accordingly, there is a need for an aircraft having apertures for routing wires adapted for use with both a dual surveillance system configuration and a configuration that requires only one or more components of the surveillance system (e.g. the ATC XPDR) be present in dual, redundant form. There is also a need for a cabinet that is populated with one or more components of the surveillance system. There is also a need for a fuselage that can be easily manufactured and outfitted to various configurations. Yet further, there is a need for a surveillance system having one or more of these or other advantageous features.

SUMMARY OF THE INVENTION

One embodiment relates to a surveillance system for an aircraft. The surveillance system comprises a first antenna comprising a four radiating element antenna. The first antenna is configured for electrical coupling to a first air traffic control transponder and a first traffic alert and collision avoidance system, and a second antenna comprising a single element antenna configured for electrical coupling to a second air traffic control transponder. The surveillance system also comprises a second antenna comprising a single radiating element antenna configured for electrical coupling to a second air traffic control transponder. The surveillance system also comprises a first mounting interface configured for coupling the first antenna to the aircraft. The surveillance system also comprises a second mounting interface configured for coupling a second antenna to the aircraft. The mounting interface of the first antenna has a size and a shape corresponding to a size and shape of the mounting interface of the second antenna.

Yet another exemplary embodiment relates to a surveillance system for an aircraft. The surveillance system comprises a first cabinet. The first cabinet comprises a first air traffic control transponder. The first cabinet also comprises a first traffic alert and collision avoidance system. The first cabinet also comprises a first terrain awareness and warning system. The first cabinet also comprises a first weather detection and avoidance radar system. The first air traffic control transponder and the first traffic alert and collision avoidance system are configured for electrical coupling to a four radiating element antenna. The surveillance system also comprises a second cabinet. The second cabinet is configured for housing a second air traffic control transponder. The second cabinet is also configured for housing a second traffic alert and collision avoidance system. The second cabinet is also configured for housing a second terrain awareness and warning system. The second cabinet is also configured for housing a second weather detection and avoidance radar system. The second cabinet includes at least the second air traffic control transponder and is configured for electrical coupling to a single radiating element antenna.

Yet another exemplary embodiment relates to a method of assembling an aircraft. The method comprises providing an airframe of the aircraft. The method also comprises providing a surveillance system inside the airframe configured for housing in a first cabinet a first air traffic control transponder, a first traffic alert and collision avoidance system, a first terrain awareness and warning system, and a first weather detection and avoidance radar system. The method also comprises providing a second surveillance system inside the airframe configured for housing in a second cabinet a second air traffic control transponder, a second traffic alert and collision avoidance system, a second terrain awareness and warning system, and a second weather detection and avoidance radar system. The method also comprises providing a first aperture and a second aperture in the airframe. The method also comprises installing a first base plate of a first antenna comprising a four radiating element antenna outside the airframe to cover the first aperture. The method also comprises installing a second base plate of a second antenna comprising a single radiating element antenna outside the airframe to cover the second aperture. The first base plate has a size corresponding to a size of the second base plate.

Yet another exemplary embodiment relates to a surveillance system for an aircraft. The surveillance system comprises an antenna. The antenna comprises a functional connector configured for electrical coupling to a functional load comprising an air traffic control transponder and a functional radiating element. The antenna also comprises a plurality of non-functional connectors each configured for coupling to a non-functional load. The surveillance system also comprises a base plate configured for coupling the antenna to the aircraft.

Still another exemplary embodiment relates to an aircraft having a surveillance system. The surveillance system comprises a first cabinet configured for housing a first air traffic control transponder, a first traffic alert and collision avoidance system, a first terrain awareness and warning system and a first weather detection and avoidance radar system. The surveillance system also comprises a second cabinet configured for housing a second air traffic control transponder, a second traffic alert and collision avoidance system, a second terrain awareness and warning system, and a second weather detection and avoidance radar system.

BRIEF DESCRIPTION OF THE DRAWINGS

Exemplary embodiments will hereafter be described with reference to the accompanying drawings, wherein like numerals denote like elements, and:

FIG. 7 is a block diagram of a method of manufacturing an aircraft having a surveillance system according to an exemplary embodiment.

DETAILED DESCRIPTION OF THE PREFERRED EXEMPLARY EMBODIMENTS

Figure 1:
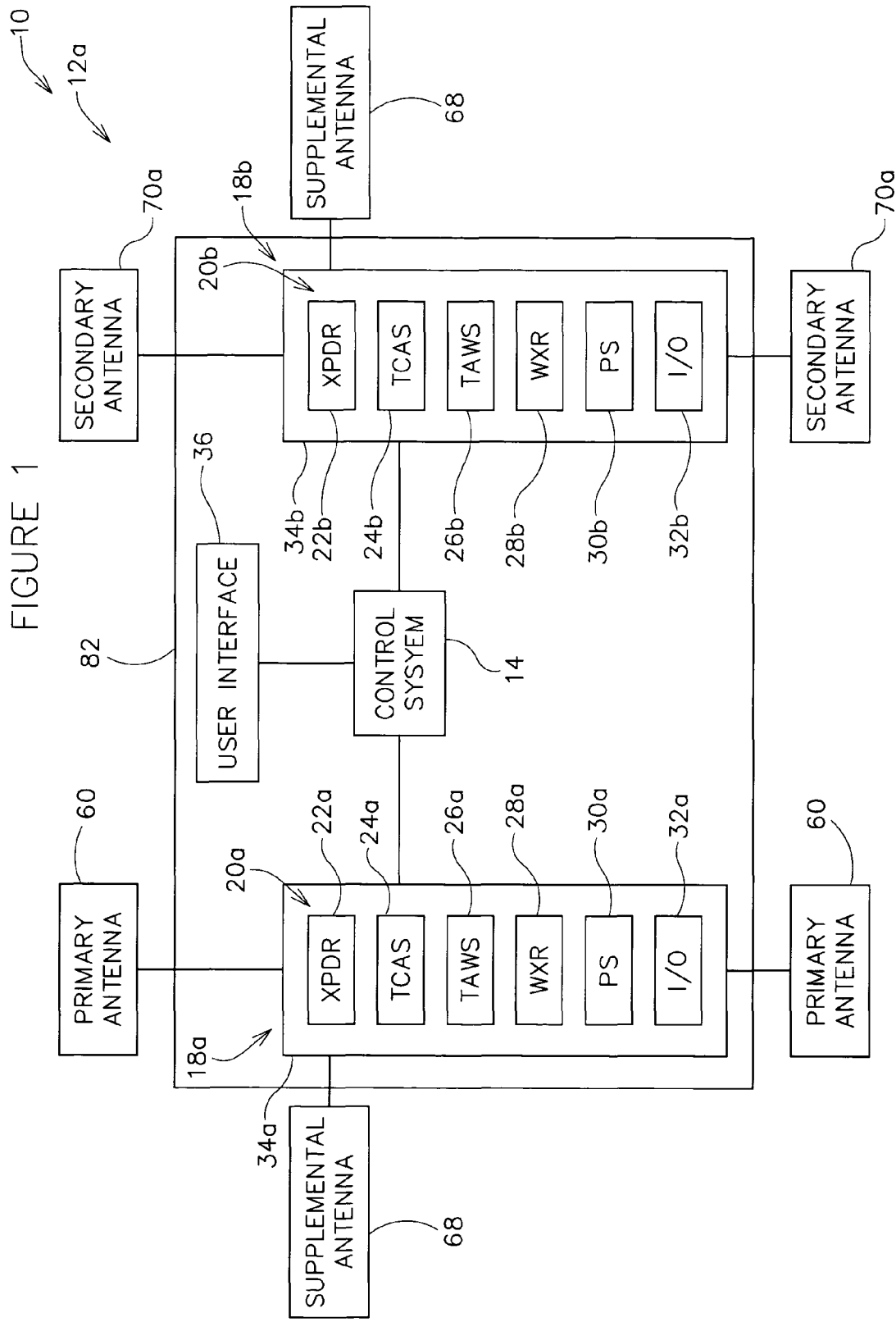
FIG. 1 is a block diagram of a surveillance system for an aircraft according to an exemplary embodiment.
Figure 2:
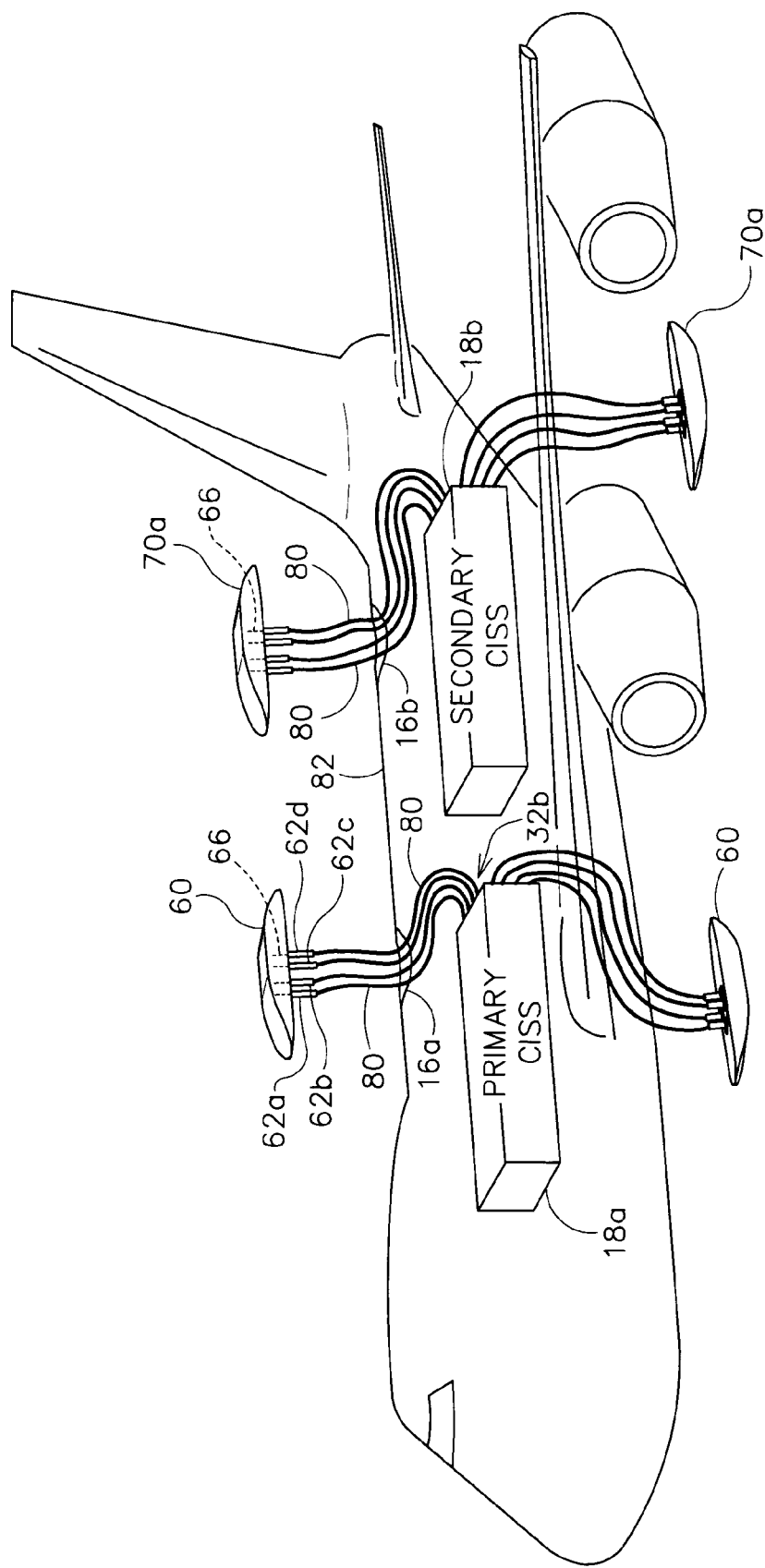
FIG. 2 is a schematic view of the surveillance system of FIG. 1 according to an exemplary embodiment.

FIGS. 1 and 2 show an aircraft 10 having a surveillance system 12a according to an exemplary embodiment. Referring to FIG. 1, surveillance system 12a includes a package shown as a rack or cabinet 34a for housing a left or primary configurable integrated surveillance system shown as a primary CISS 18a. Primary CISS 18a is intended to provide surveillance of the operational environment of aircraft 10.

Referring to FIG. 1, primary CISS 18a comprises primary subsystems or modules 20a for providing to a control system 14 signals representative of the operational environment of aircraft 10. These signals may also be provided to the flight crew by a user interface 36 as shown in FIG. 1. Primary modules 20a include a primary air traffic control transponder system (shown as a primary ATC XPDR 22a), a primary traffic alert and collision avoidance system (shown as a primary TCAS 24a), a primary terrain awareness and warning system (shown as a primary TAWS 26a), and a primary weather detection and avoidance radar system (shown as a primary WXR 28a) according to a preferred embodiment as shown in FIG. 1.

The primary ATC XPDR is the airborne portion of an air traffic control radar beacon system according to a preferred embodiment. The primary ATC XPDR replies to ground based secondary surveillance radar interrogations to provide air traffic controllers with aircraft position identification and altitude according to a preferred embodiment. The primary ATC XPDR also replies to TCAS interrogations from other aircraft according to a preferred embodiment. According to a preferred embodiment, the primary ATC XPDR has a function corresponding to a model number TPR-901 Mode S transponder commercially available from Rockwell Collins, Inc. of Cedar Rapids, Iowa.

The primary TCAS is intended to be a supplemental aid to the pilot in detecting the presence of nearby aircraft and determining their potential as an airspace threat according to a preferred embodiment. According to a preferred embodiment, the primary TCAS has a function corresponding to a ACAS-900 enhanced traffic alert and collision avoidance system commercially available from Rockwell Collins, Inc. of Cedar Rapids, Iowa. According to a particularly preferred embodiment, the primary ATC XPDR and the primary TCAS are combined into a single module in the cabinet of the configurable integrated surveillance system.

Referring further to FIG. 1, a primary power source 30a of primary CISS 18a provides electrical power to primary modules 20a. An electrical interface or wiring harness of cabinet 34a (shown as a primary input/output interface 32a) electrically connects primary modules 20a to cables (shown as coaxial cables 80 in FIG. 2). Cables 80 communicate signals (e.g. radio frequency signals) between primary modules 20a and a set of primary antennas 60 located on the top and the bottom of aircraft 10 (see FIG. 1). According to a preferred embodiment as shown in FIG. 1, primary ATC XPDR 22a and primary TCAS 24a are electrically connected to primary antennas 60 and primary WXR 28a is electrically connected to a supplemental or radar antenna 68.

The cabinet of the primary CISS is mounted to the interior of the aircraft by a mounting interface (such as a bracket) according to any preferred or alternative embodiment. According to a particularly preferred embodiment, the cabinet of the primary CISS is about 10 inches wide, about 14 inches deep and about 7.5 inches in height.

Figure 3:
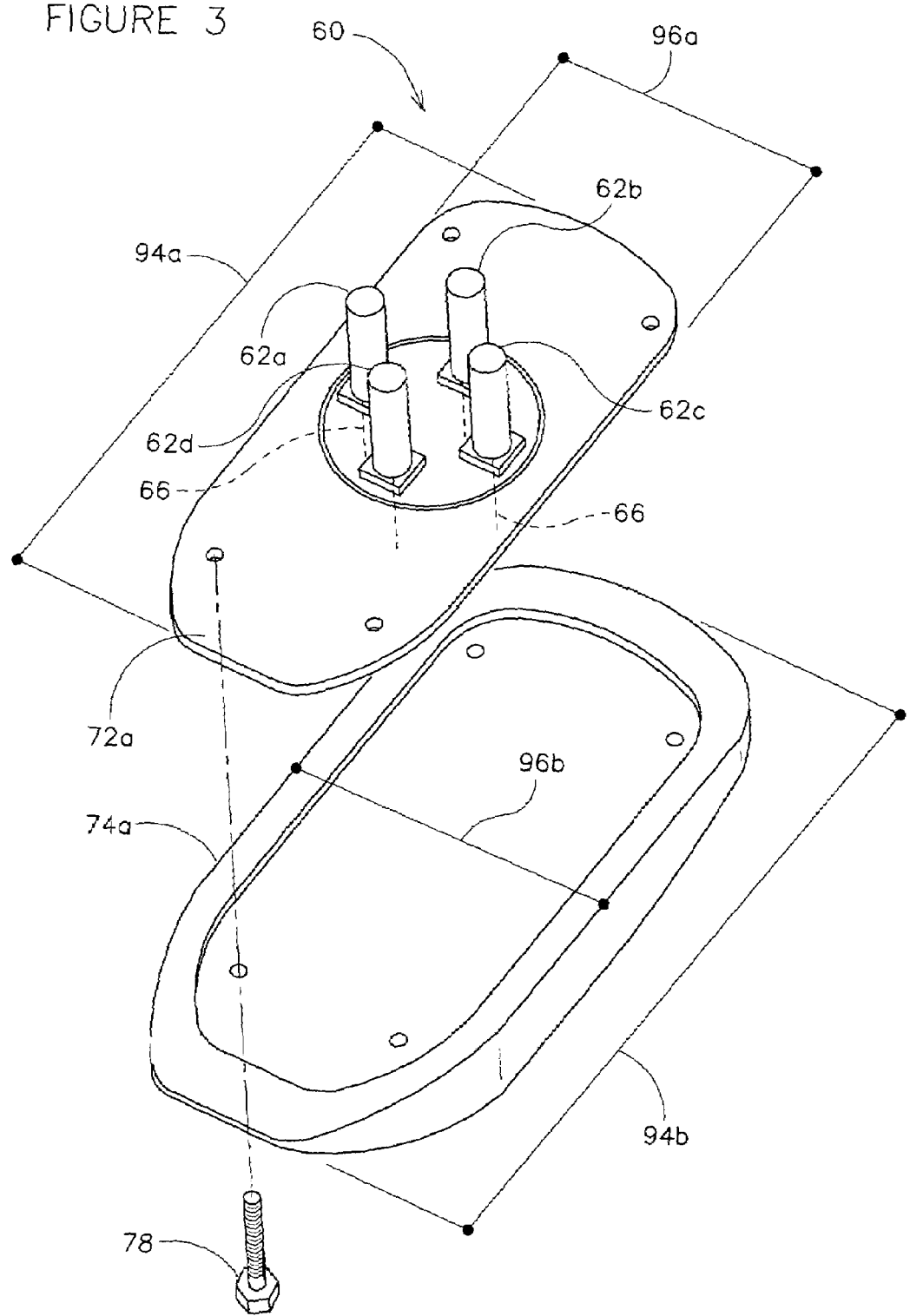
FIG. 3 is an exploded perspective view of a primary antenna of the surveillance system of FIG. 1 according to an exemplary embodiment.

Referring to FIGS. 2 and 3, each of primary antennas 60 (each a four radiating element primary antenna) has four electrical mounting interfaces or channels shown as connectors 62a, 62b, 62c and 62d in FIG. 3 according to a preferred embodiment. One end of each of connectors 62a through 62d are connected to an antenna or radiating element 66 which has a height of about 0.7 inches according to a particularly preferred embodiment. The other end of each of connectors 62a through 62d is electrically connected to primary ATC XPDR 22a and primary TCAS 24a by cables 80 according to a preferred embodiment as shown in FIG. 2. Cables 80 are routed through an aperture 16a in a fuselage or airframe (shown as a shell 82) of aircraft 10 (see FIG. 2). According to a particularly preferred embodiment, the aperture has a circular shape with a diameter of about 4 inches. Fasteners (shown as screws 78) removably attach a mounting or base plate 72a to shell 82 to cover aperture (and allow servicing of the antennas).

According to a preferred embodiment as shown in FIG. 3, base plate 72a has a generally square shape with rounded corners. Base plate has a length 94a, which is greater than a width 96a according to a preferred embodiment as shown in FIG. 3. The base plate is a flat sheet of metal integrally molded with the connectors according to a preferred embodiment. The four radiating element primary antennas may extend at least partially from the base plate according to any preferred or other alternative embodiment. Primary antennas 60 are covered by a "radome" cap or polyfilm shield 74a having a square shape with a length 94b and a width 96b as shown in FIG. 3 according to a preferred embodiment. Primary antennas 60 each have a height 98 from base plate 72a to shield 74a as shown in FIG. 3 according to a preferred embodiment.

According to a particularly preferred embodiment, the length of the base plate of the four radiating element primary antenna is greater than about 6 inches, suitably less than about 11 inches. According to a particularly preferred embodiment, the width of the base plate of the four radiating element primary antenna is greater than about 3.5 inches, suitably less than about 6.25 inches. According to a particularly preferred embodiment, the length of the shield of the four radiating element primary antenna is about 11 inches. According to a particularly preferred embodiment, the width of the shield of the four radiating element primary antenna is at least about 6 inches, more suitably about 6.25 inches. According to a particularly preferred embodiment, the height of the four radiating element primary antenna from the base plate to the top of the shield is less than about 1.36 inches.

According to a preferred embodiment, the four radiating element primary antenna is an L-band antenna that operates on a frequency of about 1030 MHz to about 1090 MHz. According to a particularly preferred embodiment, the four radiating element primary antenna is a model number S72-1735 traffic collision avoidance system II antenna commercially available from Sensor Systems, Inc. of Chatsworth, Calif.

Referring back to FIG. 1, surveillance system 12a includes a right or redundant (e.g. backup) secondary CISS 18b electrically connected to control system 14. The construction and performance of secondary CISS 18b is similar to that of primary CISS 18a. Secondary CISS 18b comprises redundant or secondary modules 20b including a secondary ATC XPDR 22b, a secondary TCAS 24b, a secondary TAWS 26b, and a secondary WXR 28b according to a preferred embodiment as shown in FIG. 1. A secondary power source 30b provides electrical power to secondary modules 20b. A secondary input/output interface 32b electrically connects secondary modules 20b to cables 80 (see FIG. 2) for communication of signals with a set of secondary antennas 70a located on the top and the bottom of aircraft 10. According to a preferred embodiment as shown in FIG. 1, secondary ATC XPDR 22b and secondary TCAS 24b are electrically connected to secondary antennas 70a, and secondary WXR 28b is electrically connected to radar antenna 68.

The set of secondary antennas 70a (see FIGS. 1 and 2) each comprise a four radiating element secondary antenna according to a preferred embodiment and each have a construction and performance that is similar to that of the set of four radiating element primary antennas 60 (see FIGS. 1 and 2). According to an alternative embodiment as shown in FIG. 1, the surveillance system may comprise more than one primary antenna (e.g. a primary antenna for the primary CISS installed on the top and the bottom of the aircraft and/or more than one secondary antenna (e.g. a secondary antenna for the secondary QISS installed on the top and the bottom of the aircraft).

Figure 4:
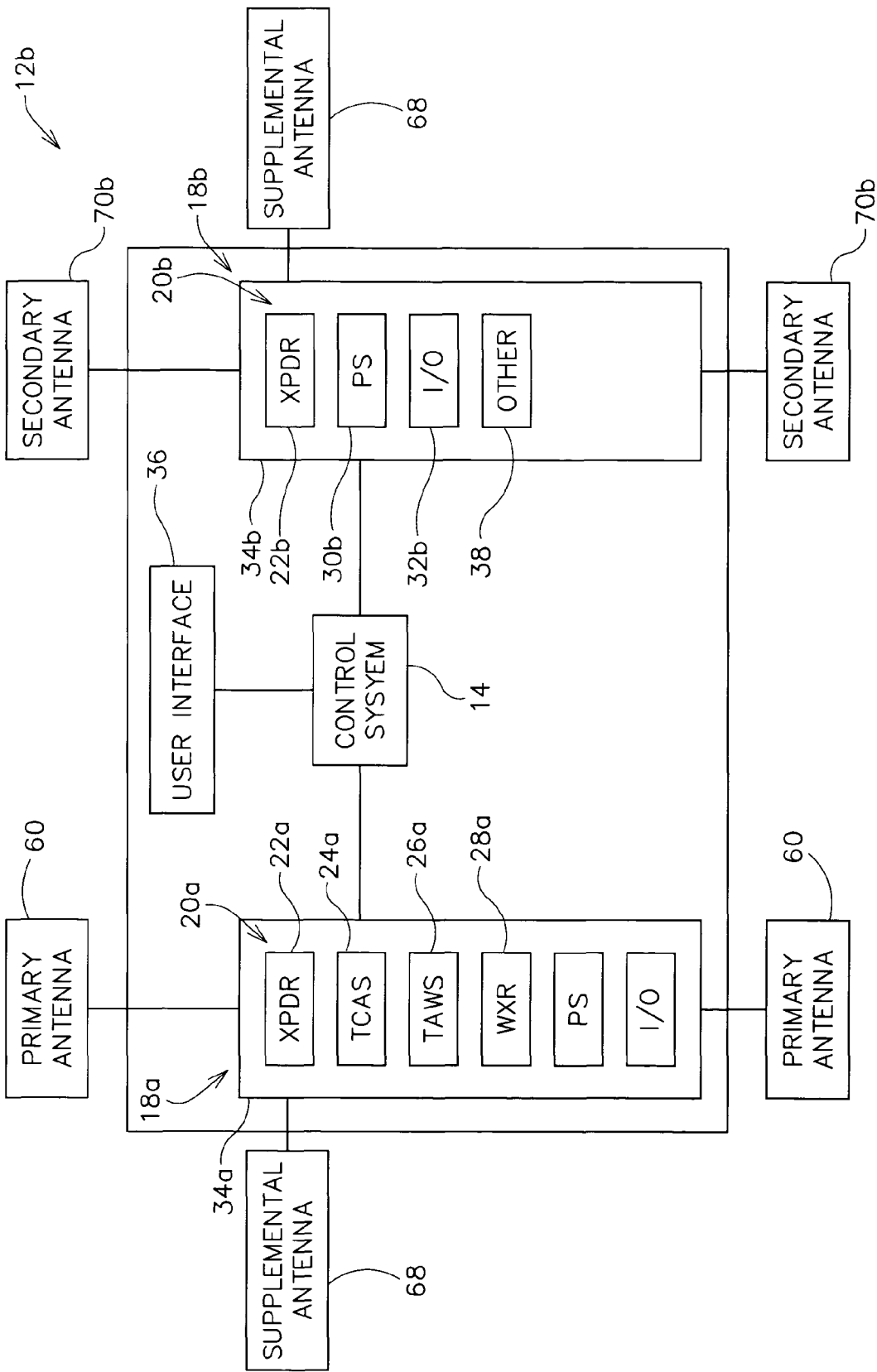
FIG. 4 is a block diagram of the surveillance system of FIG. 1 according to an alternative embodiment.

FIG. 4 shows a surveillance system 12b, an alternative embodiment of surveillance system 12a. In one preferred embodiment, surveillance system 12b can be modified from surveillance system 12a in at least two respects: (1) Secondary CISS 18b includes fewer secondary modules 20b than primary CISS 18a; and (2) a set of secondary antennas 70b are each a single functional radiating element secondary antenna that has a different function than the set of primary antennas 60. Other than these modifications, the construction and performance of surveillance system 12b is similar to that of surveillance system 12a and like reference numerals identify like elements.

Figure 5:
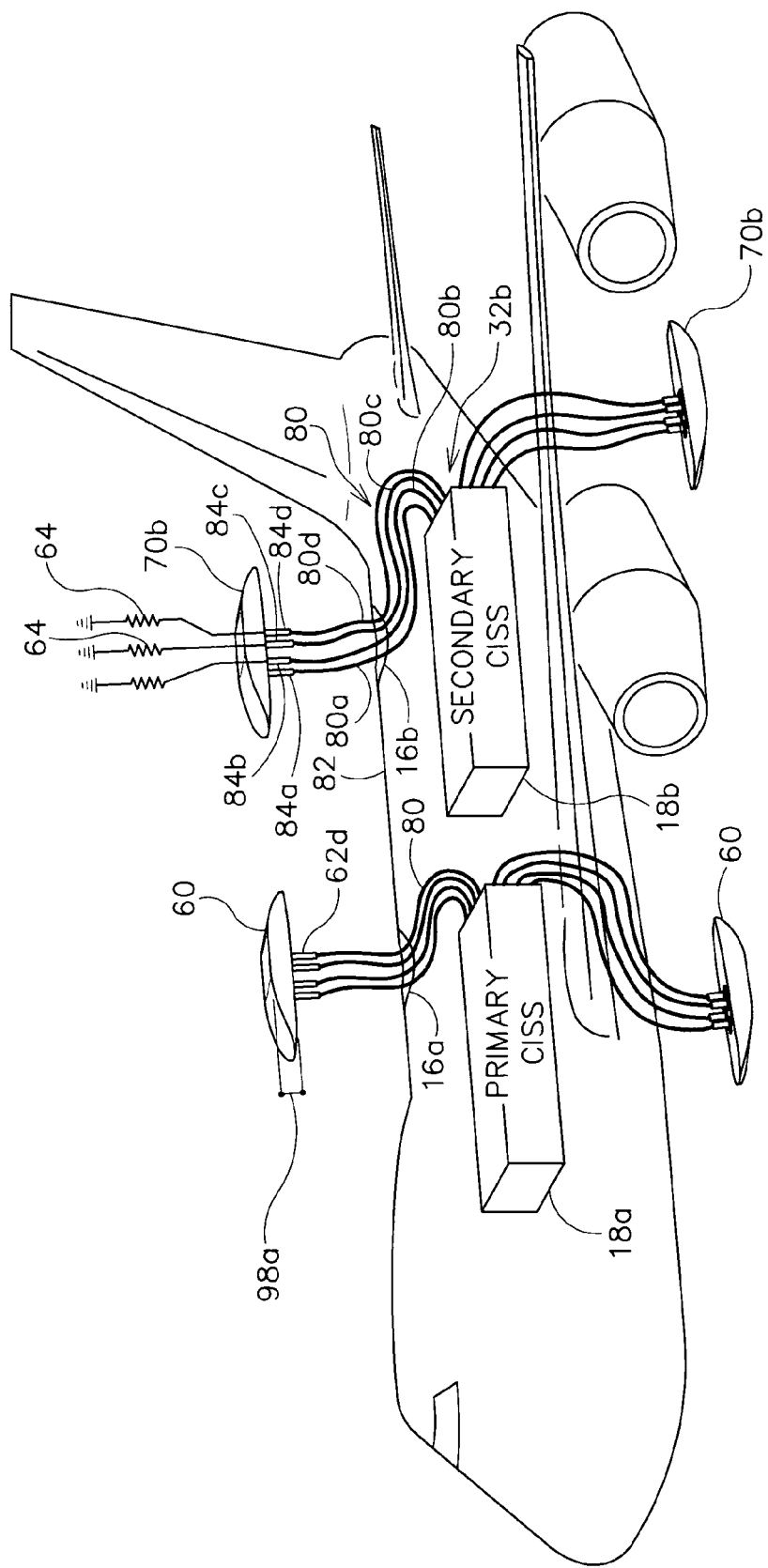
FIG. 5 is a schematic view of the surveillance system of FIG. 4 according to an exemplary embodiment.

Secondary modules 20b of secondary CISS 18b include secondary ATC XPDR 22b as shown in FIG. 4. According to an alternative embodiment, the secondary modules may also include at least one of the following other subsystems 38: a secondary TCAS, a secondary TAWS, and/or a secondary WXR. Secondary power source 30b provides electrical power to secondary modules 20b of CISS 18b. Input/output interface 32b electrically connects secondary modules 20b of CISS 18b to cables 80 (see FIG. 5) for communication of signals with secondary antennas 70b. According to a particularly preferred embodiment, the cabinet of the primary CISS has a similar size and shape as the cabinet of the secondary CISS.

According to a preferred embodiment as shown in FIG. 4, primary ATC XPDR 22a and primary TCAS 24a are electrically connected to primary antennas 60, and primary WXR 28a is electrically connected to radar antenna 68. According to a preferred embodiment as shown in FIG. 4, secondary ATC XPDR 22b is electrically connected to secondary antennas 70b and primary WXR 28b is electrically connected to radar antenna 68. According to a preferred embodiment as shown in FIG. 4, secondary antennas 70b are each a single radiating element secondary antenna for association with ATC XPDR 22b. According to an alternative embodiment, each of the set of the secondary antenna may be a four radiating element secondary antennas (similar to antennas 70a shown in FIG. 1) for electrical coupling to both a secondary ATC XPDR and a secondary TCAS.

Referring further to FIG. 4, secondary antennas 70b each have a construction that is similar to that of secondary antennas 70a. According to a preferred embodiment as shown in FIG. 6, the dimensions of a base plate 72b and a shield 74b of secondary antennas 70b are substantially the same of base plate 72a and shield 74a of primary antennas 60.

Figure 6:
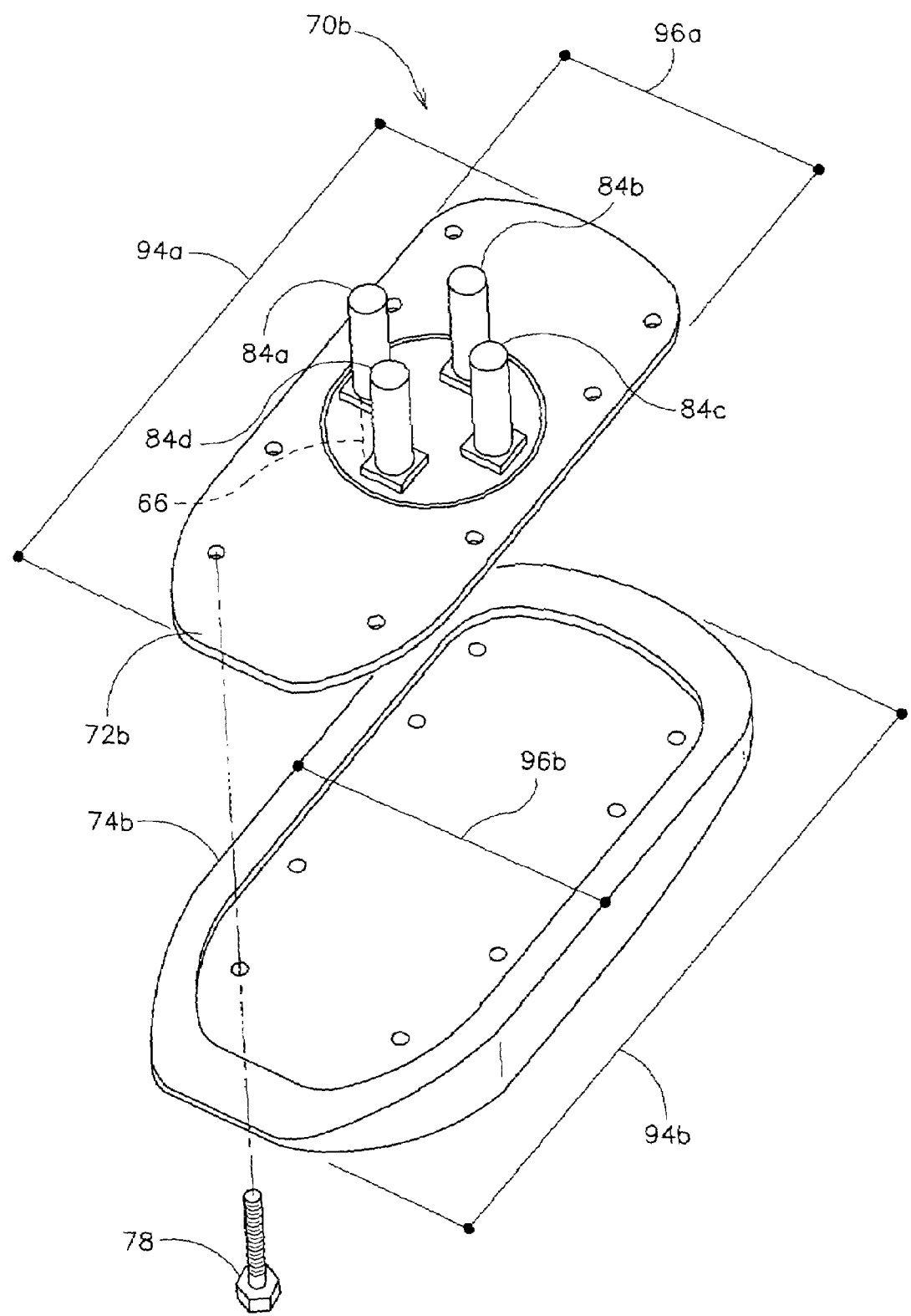
FIG. 6 is an exploded perspective view of a secondary antenna of the surveillance system of FIG. 4 according to an exemplary embodiment.

Secondary antennas 70b each have one functional electrical mounting interface shown as a connector 84a in FIG. 6. One end of connector 84a is electrically connected to secondary ATC XPDR 22b through input/output interface 32b (see FIG. 5) by a cable 80a. The other end of connector 84a is attached to a single antenna or radiating element 66. Each of secondary antennas 70b has three non-functional electrical mounting interfaces shown as connectors 84b, 84c and 84d in FIG. 6 according to a preferred embodiment. Connectors 84b, 84c and 84d (respectively) are electrically connected to a "dummy" or non-functional load shown as a resistor 64 (see FIG. 5). Thus, three cables 84b from input/output interface 32b (e.g. those not electrically connected to secondary ATC XDPR 22b or intended for use with the optional secondary TCAS 24b) are attached to connectors 84b, 84c and 84d and terminate at resistor 64 (see FIG. 5). According to an alternative embodiment, the three cables from the input/output interface (e.g. those not electrically connected to the secondary ATC XDPR or intended for use with the optional secondary TCAS) are capped and stowed. According to a particularly preferred embodiment, the single functional radiating element antenna has the same functionality as a model number series S65-5366 L-band antenna that operates on a frequency of about 1030 MHz to about 1090 MHz and is commercially available from Sensor Systems, Inc. of Chatsworth, Calif.

The secondary CISS is reconfigurable depending on the configuration desired for the aircraft. For example, the secondary TCAS, secondary TAWS and/or secondary WXR may be provided (e.g. as a "tray") in cabinet 34b (see FIG. 4). The secondary TCAS may be electrically connected to a four radiating element primary antenna having a base plate with similar dimensions as secondary antenna 70a (see FIGS. 2 and 3).

The reconfigurability of the secondary CISS (an "LRU" or line replaceable unit) may provide manufacturing advantages. For example, the manufacturer of the aircraft may follow the manufacturing system 100 as shown in FIG. 7. First, the manufacturer provides the airframe of the aircraft (step 102). An aperture intended for the cables of the primary CISS is drilled in the top and the bottom of the airframe (step 104) (see also FIGS. 3 and 5). An aperture intended for the cables of the secondary CISS is also drilled in the top and bottom of the airframe (step 106) (see also FIGS. 3 and 5). The apertures for the primary CISS and the apertures for the secondary CISS have the same dimensions according to a preferred embodiment. The apertures for the primary CISS and the secondary CISS each have a diameter of about 4 inches according to a particularly preferred embodiment.

The components of the surveillance system are then provided in the aircraft. The cabinet for the primary CISS and the cabinet for the secondary CISS are mounted to the interior of the aircraft (step 108). The cabinet of the primary CISS is then populated with the primary ATC XPDR, the primary TCAS, the primary TAWS, and the primary WXR (step 110). The secondary CISS cabinet is then populated (step 112). According to a preferred embodiment, the secondary CISS cabinet is populated with the secondary ATC XPDR. According to other alternative embodiments, the secondary CISS cabinet is populated with the secondary TCAS, the secondary TAWS, and/or the secondary WXR. The CISS cabinets may also be populated with the power sources and the input/output interfaces according to alternative embodiments.

The base plate of the four radiating element primary antenna is then attached to the airframe to cover the top and bottom apertures intended for use with the primary CISS (step 114). The wires of the components of the primary CISS cabinet and the secondary CISS cabinet are then routed to the four radiating element primary antenna. Specifically, the input/output interface of the primary CISS cabinet is connected to the connectors of the top and bottom four radiating element primary antennas (step 116).

The base plate of the single functional radiating element secondary antenna is then fixed to the airframe to cover the top and bottom apertures intended for use with the secondary CISS (step 118). (According to an alternative embodiment, the single functional radiating element secondary antenna of the secondary CISS may be replaced with a four radiating element primary antenna (step 120)). The input/output interface of the secondary CISS cabinet is connected to the channels of the top and bottom single functional radiating element secondary antennas (step 122). According to a preferred embodiment as shown in FIG. 6, the secondary ATC XPDR is attached to the functional connector of the single functional radiating element secondary antenna, and the cables for the optional secondary TCAS are attached to the non-functional elements of the single functional radiating element secondary antenna. Thus, the manufacturer may standardize the airplane coming off an assembly line (e.g. same sized holes in the apertures for the antennas, same number of cables attached to the base plates and/or cabinets, configurable and/or different modules populating the cabinet(s), etc.).

It is understood that while the detailed descriptions, specific examples, material types, thickness, dimensions, and shapes discussed provide preferred exemplary embodiments of the present invention, the preferred exemplary embodiments are for the purpose of illustration only. For example, the cabinets may be populated with any of the elements or modules (e.g. only a transponder in the CISS cabinet(s)). The method and the system of the present invention are not limited to the precise details and conditions disclosed. Various changes will be made to the details disclosed without departing from the scope of the invention, which is defined by the following claims.

What is claimed is:

1. A surveillance system for an aircraft, comprising:
    a first antenna comprising a four radiating element antenna configured for electrical coupling to:
        a first air traffic control transponder;
        a first traffic alert and collision avoidance system;
    a second antenna comprising a single radiating element antenna configured for electrical coupling to a second air traffic control transponder;
    a first mounting interface configured for coupling the first antenna to the aircraft;
    a second mounting interface configured for coupling the second antenna to the aircraft;
    wherein the mounting interface of the first antenna has a size and a shape corresponding to a size and shape of the mounting interface of the second antenna.

2. The surveillance system of claim 1 wherein the first mounting interface is a first base plate and the second mounting interface is a second base plate.

3. The surveillance system of claim 2 wherein the base plate of the first antenna has a generally rectangular shape.

4. The surveillance system of claim 3 wherein the second antenna is configured to send a signal representative of at least one of the position and altitude of the aircraft.

5. The surveillance system of claim 4 wherein the base plate of the second antenna has a length of at least about 11 inches.

6. The surveillance system of claim 5 wherein the base plate of the second antenna has a width of at least about 6 inches.

7. The surveillance system of claim 6 wherein the second antenna comprises an upper antenna and a lower antenna.

8. The surveillance system of claim 1 wherein the second antenna further comprises a plurality of non-functional elements configured for electrical coupling to a load.

9. The surveillance system of claim 1 wherein the first antenna and the second antenna each are an L-band antenna.

10. A surveillance system for an aircraft comprising:
    a first cabinet, comprising:
        a first air traffic control transponder;
        a first traffic alert and collision avoidance system;
        a first terrain awareness and warning system;
        a first weather detection and avoidance radar system;
    wherein the first air traffic control transponder and the first traffic alert and collision avoidance system are configured for electrical coupling to a four radiating element antenna;
    a second cabinet configured for housing:
        a second air traffic control transponder;
        a second traffic alert and collision avoidance system;
        a second terrain awareness and warning system;
        a second weather detection and avoidance radar system;

wherein the second cabinet includes at least the second air traffic control transponder and is configured for electrical coupling to a single radiating element antenna.

11. The surveillance system of claim 10 wherein a mounting interface of the four radiating element antenna has a shape corresponding a mounting interface of the single radiating element antenna.

12. The surveillance system of claim 11 wherein the mounting interface of the four radiating element antenna comprises a first base plate and the mounting interface of the single radiating element antenna comprises a second base plate.

13. The surveillance system of claim 12 wherein the first cabinet and the second cabinet each comprise a configurable integrated surveillance system.

14. The surveillance system of claim 13 further comprising the four radiating element antenna electrically coupled to the first cabinet.

15. The surveillance system of claim 14 further comprising the single element radiating antenna electrically coupled to the second cabinet.

16. The surveillance system of claim 15 wherein the four radiating element antenna is an L-band antenna and comprises four functional connectors and the single radiating element antenna is an L-band antenna and comprises a single functional connector.

17. A method of assembling an aircraft, comprising:
providing an airframe of the aircraft;
providing a surveillance system inside the airframe and configured for housing in a first cabinet:
 a first air traffic control transponder;
 a first traffic alert and collision avoidance system;
 a first terrain awareness and warning system;
 a first weather detection and avoidance radar system;
providing a second surveillance system inside the airframe and configured for housing in a second cabinet:
 a second air traffic control transponder;
 a second traffic alert and collision avoidance system;
 a second terrain awareness and warning system;
 a second weather detection and avoidance radar system;
providing a first aperture and a second aperture in the airframe;
installing a first base plate of a first antenna comprising a four radiating element antenna outside the airframe to cover the first aperture;
installing a second base plate of a second antenna comprising a single radiating element antenna outside the airframe to cover the second aperture;
wherein the first base plate has a size corresponding to a size of the second base plate.

18. The surveillance system of claim 17 wherein installing the first base plate further comprises installing the first base plate having a shape corresponding to a shape of the second base plate.

19. The surveillance system of claim 18 wherein providing the first aperture and the second aperture further comprises providing the first aperture having a size corresponding to a size of the second aperture.

20. The surveillance system of claim 19 wherein providing the first aperture and the second aperture further comprises providing the first aperture having a shape corresponding to a shape of the second aperture.

21. The surveillance system of claim 20 further comprising:
providing in the first cabinet:
 the first air traffic control transponder;
 the first traffic alert and collision avoidance system;
 the first terrain awareness and warning system;
 the first weather detection and avoidance radar system;
providing in the second cabinet: the second air traffic control transponder.

22. The surveillance system of claim 21 further comprising electrically coupling the first storage unit to the first antenna and electrically coupling the second storage unit to the second antenna.

23. An aircraft having a surveillance system, comprising:
a first cabinet configured for housing:
 a first air traffic control transponder;
 a first traffic alert and collision avoidance system;
 a first terrain awareness and warning system;
 a first weather detection and avoidance radar system;
a second cabinet configured for housing:
 a second air traffic control transponder;
 a second traffic alert and collision avoidance system;
 a second terrain awareness and warning system;
 a second weather detection and avoidance radar system.

24. The aircraft of claim 23 wherein the first cabinet has a size and a shape corresponding to size and a shape of the second cabinet.

25. The aircraft of claim 24 further comprising the first air traffic control transponder in the first cabinet and second air traffic control transponder in the second cabinet.

26. The aircraft of claim 25 further comprising the first traffic alert and collision avoidance system in the first cabinet.

27. The aircraft of claim 26 wherein the first cabinet has a length of at least about 9 inches, a width of at least about 12 inches and a height of at least about 6 inches.

* * * * *